(12) United States Patent
De Freitas Cunha et al.

(10) Patent No.: US 10,198,208 B2
(45) Date of Patent: Feb. 5, 2019

(54) PERFORMING COLLECTIVE I/O OPERATIONS WITHIN OPERATING SYSTEM PROCESSES

(71) Applicant: INTERNATIONAL BUSINESS MACHINES CORPORATION, Armonk, NY (US)

(72) Inventors: Renato Luiz De Freitas Cunha, Sao Paulo (BR); Lucas Correia Villa Real, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

(21) Appl. No.: 14/940,666

(22) Filed: Nov. 13, 2015

(65) Prior Publication Data
US 2017/0139614 A1    May 18, 2017

(51) Int. Cl.
*G06F 17/30* (2006.01)
*G06F 3/06* (2006.01)

(52) U.S. Cl.
CPC ............ *G06F 3/0643* (2013.01); *G06F 3/061* (2013.01); *G06F 3/067* (2013.01); *G06F 17/30144* (2013.01); *G06F 3/0662* (2013.01)

(58) Field of Classification Search
CPC .... G05F 3/0613; G05F 3/0619; G05F 3/0617; G05F 3/0638; G05F 3/0659
USPC ...................................................... 707/799
See application file for complete search history.

(56) References Cited

U.S. PATENT DOCUMENTS

| | | | |
|---|---|---|---|
| 5,072,378 A | 10/1991 | Manka | |
| 5,269,013 A | 12/1993 | Abramson et al. | |
| 6,105,104 A | 8/2000 | Guttmann et al. | |
| 6,272,565 B1 | 8/2001 | Lamberts | |
| 6,654,295 B2 | 11/2003 | Frank, Jr. et al. | |
| 7,477,477 B2 | 1/2009 | Maruchi et al. | |
| 8,700,879 B2 * | 4/2014 | Porzio | G11C 7/22 711/103 |
| 9,274,937 B2 * | 3/2016 | Batwara | G06F 3/0608 |
| 2012/0210095 A1 * | 8/2012 | Nellans | G06F 12/1072 711/206 |
| 2013/0212319 A1 * | 8/2013 | Hida | G06F 12/0246 711/103 |

OTHER PUBLICATIONS

Kivity et al., OSv—Optimizing the Operating System for Virtual Machines, 2014 USENIX Annual Technical Conference, pp. 61-72. (Year: 2014).*

(Continued)

*Primary Examiner* — Cheyne D Ly
(74) *Attorney, Agent, or Firm* — F. Chau & Associates, LLC (57) ABSTRACT

A computer storage management system includes a memory storing a process; a processor executing the process; and an operating system (OS). The OS includes a filesystem configured to receive a plurality of requests from the process to access data stored on the memory; and a filesystem event handler configured to receive the requests in a sequence determined by an order in which instructions associated with the requests occur within the process, store the sequence of requests without accessing the memory, and execute the sequence of requests.

13 Claims, 9 Drawing Sheets

(56) References Cited

OTHER PUBLICATIONS

Sun et al, RALD: Reliable Transactional Software Controller for Redundancy Array of Log Structured Disks, Aug. 24-26, 2015, pp. 110-121. (Year: 2015).*
Pirkola, "A file system for a general-purpose time-sharing environment." Proceedings of the IEEE 63.6 (1975): 918-924.
Matthews, "Improving file system performance with adpative methods." Diss. University of California at Berkeley, 1999.
Domjan, "Processor management for adaptive applications." Diss. ETH Zürich, 2001.
Jacobson et al., "Disk scheduling algorithms based on rotational position." Palo Alto, CA: Hewlett-Packard Laboratories, 1991.
Reuther et al., "Rotational-position-aware real-time disk scheduling using a dynamic active subset (DAS)." Real-Time Systems Symposium, 2003. RTSS 2003. 24th IEEE. IEEE, 2003.

* cited by examiner

1. fileHandle = open ("filename")
2. pread (fileHandle, outputBuffer1, 1024, 4096)
3. pread (fileHandle, outputBuffer2, 1024, 0)
4. compute_checksums ([outputBuffer1, outputBuffer2])

PERFORMING COLLECTIVE I/O OPERATIONS WITHIN OPERATING SYSTEM PROCESSES

BACKGROUND

The present invention relates to the fields of filesystems and operating systems, and more particularly to optimizing processing of I/O operations on a filesystem by an operating system. An operating system is system software that manages computer hardware and software resources and provides common services for computer programs. The operating system is a component of the system software in a computer system. With the aid of firmware and device drivers, the kernel of the operating system provides the most basic level of control over all of the computer's hardware devices. The kernel organizes data for long term storage with file systems on media such as disks, tapes, and flash memory.

A filesystem is used to control how data is stored and retrieved. The operating system enables a user application to access data stored by the filesystem. For example, the operating system may provide system calls that can be used by the user application program to open a file stored on the filesystem and read data from the opened file. However, the order at which the user application execute these system calls may cause unnecessary delays.

SUMMARY

An exemplary embodiment of the present invention provides a computer storage management system that includes a memory storing a process; a processor executing the process; and an operating system (OS). The OS includes a filesystem configured to receive a plurality of requests from the process to access data stored on the memory; and a filesystem event handler configured to receive the requests in a sequence determined by an order in which instructions associated with the requests occur within the process, store the sequence of requests without accessing the memory, and execute the sequence of requests.

According to an exemplary embodiment of the invention, a method of controlling a storage management system includes: storing a plurality of requests into a queue, wherein each request is generated as a result of a process executing a read function to read data from a file; for each stored request, un-mapping an area of a memory map of the process corresponding to an address in which the corresponding read data is to be copied; re-mapping the areas when a condition occurs; and executing the sequence of requests after the re-mapping has been performed.

An exemplary embodiment of the present invention provides a method of modifying an existing operating system. The method includes inserting code into a read function of the operating system that stores a request into a queue and un-maps an area of a process map table of a process, each time the read function is executed by the process to read data from a file, wherein the area includes an address where the read data is to be copied; and inserting code into an event handler of the operating system to re-map the areas when the process requires access to one of the areas.

BRIEF DESCRIPTION OF THE SEVERAL VIEWS OF THE DRAWINGS

Through the more detailed description of some embodiments of the present disclosure in the accompanying drawings, features of the present disclosure will become more apparent, wherein.

DETAILED DESCRIPTION

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

Filesystems can be heavily optimized by performing collective I/O operations. That is, if a given process P1 requests to read 100 bytes from FileA starting at offset 0, process P2 requests to read 100 bytes starting at offset 100, and process P3 requests to read 100 bytes from FileA starting at offset 200, then an optimized file system can sort these requests according to the cost of accessing the request's offset or perform a single read operation that covers the entire range of data requested by the processes (e.g., applications). However, since the file opening calls and file reading calls used to read these bytes are serialized, there is nothing the filesystem can do to perform optimized access to the underlying media. Accordingly, embodiments of the invention provide a way of converting sequential sequences of read operations into parallel requests to the filesystem with no changes to the user application code.

Figure 1:
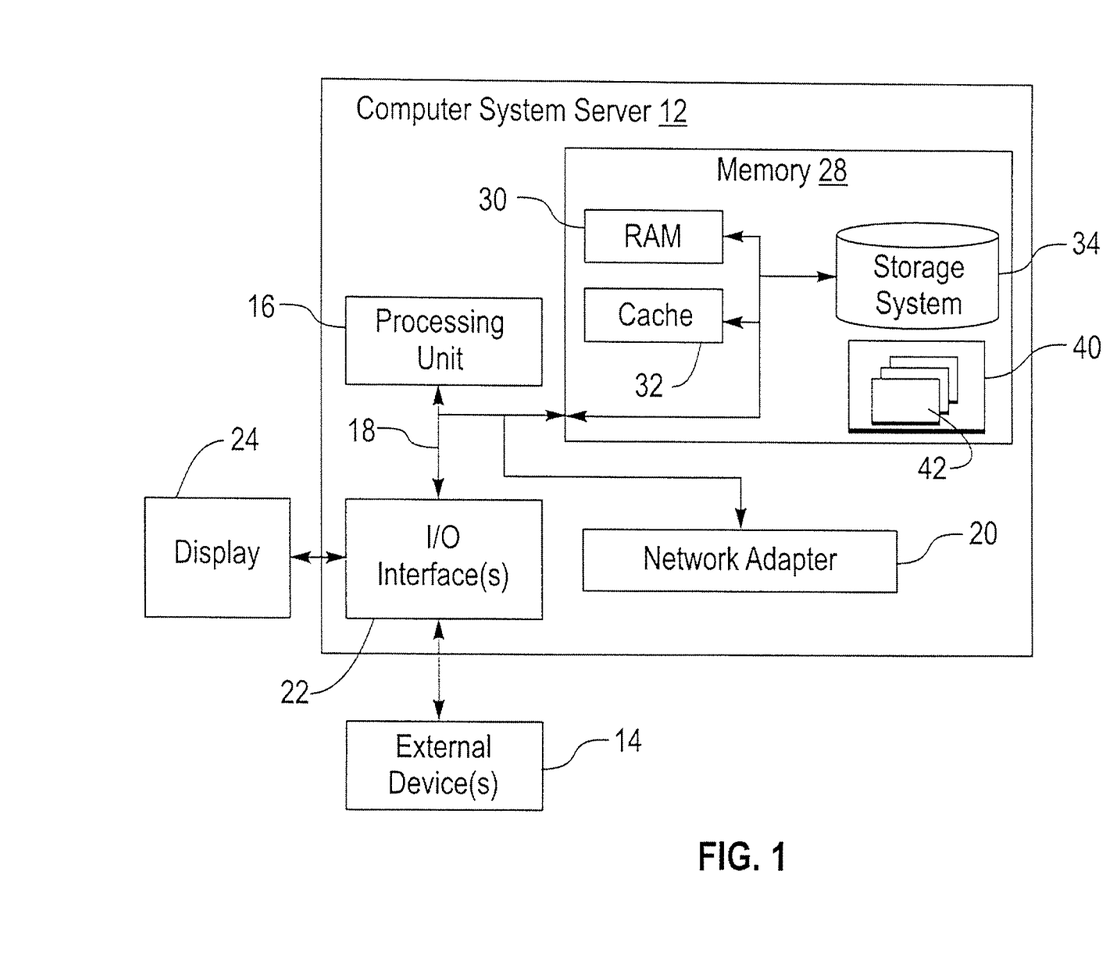
FIG. 1 shows an exemplary computer system, which is applicable to implementing embodiments of the present invention.

FIG. 1 illustrates an exemplary computer system/server 12, which is applicable to implementing embodiments of the present invention. Computer system/server 12 is only illustrative and is not intended to suggest any limitation as to the scope of use or functionality of embodiments of the invention described herein.

As shown in FIG. 1, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 2:
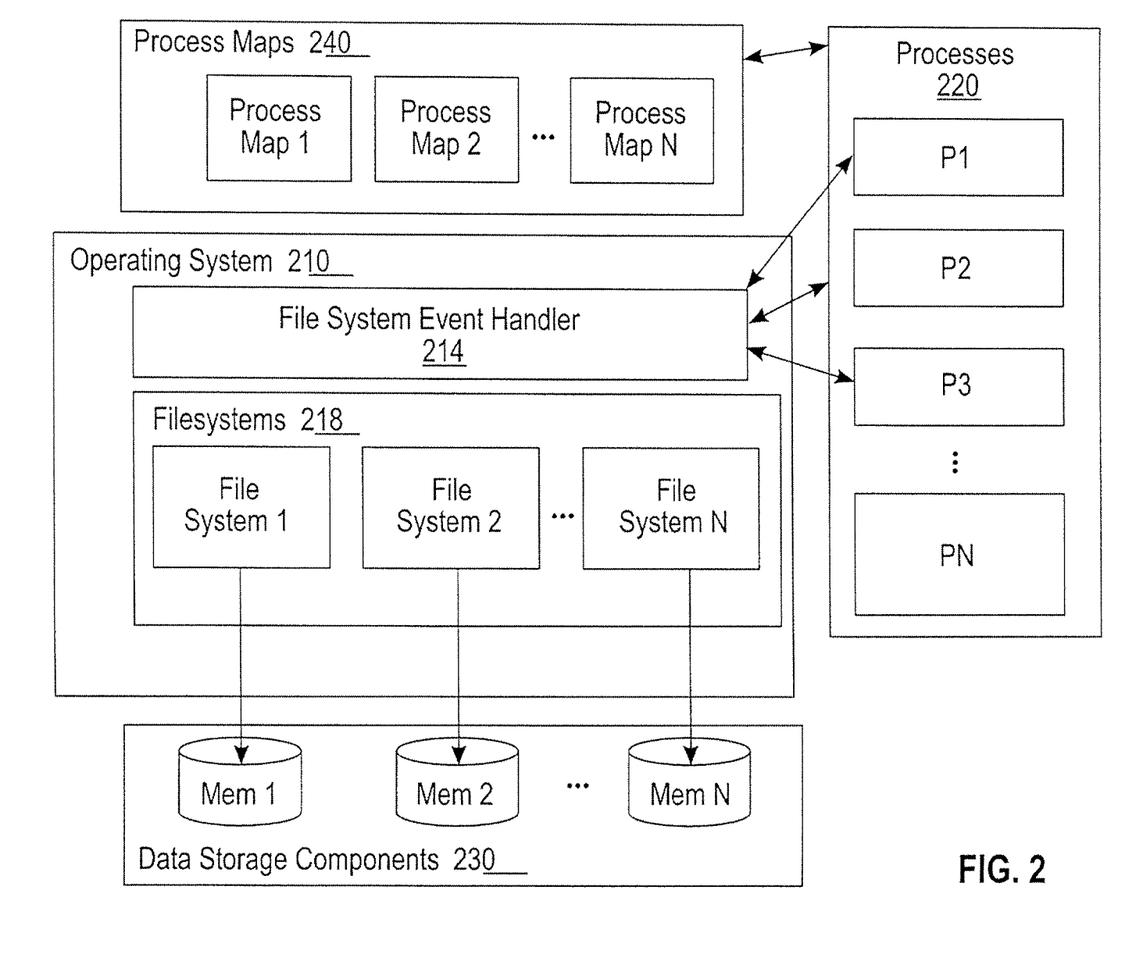
FIG. 2 shows an architecture of the computer system according to an exemplary embodiment of the present invention.

FIG. 2 illustrates an architecture according to an exemplary embodiment of the invention. The architecture includes an operating system 210, processes 220, data storage components 230, and process maps 240. The operating system 210 and the processes 220 may reside in memory 28 or a memory that is remote to the system 12. The storage components 230 may correspond to the external devices 14. The operating system 210 includes a file system event handler 214 and one or more file systems 218, for accessing the data storage components 230, the process maps 240, and the processes 220. The processes 220 may be system processes or user processes. The process maps 240 represent the address space of the processes 220. In an embodiment, the processes 220 need to requests that the kernel of the OS 210 enlarge or shrink their memory regions. The operating system 210 maintains, within itself, data structures for managing the processes 220. For example, the operating system 210 uses these data structures to maintain a representation of the processes 220 so it can select which one to run.

Figure 3:
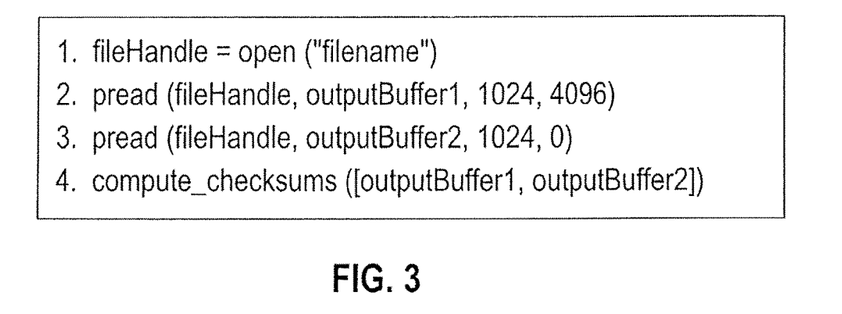
FIG. 3 illustrates sample code of a process that is used to described embodiments of the invention.

FIG. 3 illustrates an example of code including sequential read accesses that will be discussed to explain embodiments of the inventive concept. This code or code like it, may be executed by any one of the processes 220. The communication between user processes (e.g., P1, P2, etc.) and the filesystem (e.g., see File system 1 in FIG. 2) happens through system calls. For example, when the process (e.g., P1) issues an open("filename") system call (see line 1 of FIG. 3), the kernel of the operating system 210 invokes the open( ) method of the filesystem (e.g., File system 1) that hosts the file with name "filename", which in turn does the job of opening that file and returning a file handle (e.g., a number assigned by the OS to a file when that file is opened) to the process (e.g., P1). Afterwards, the application can invoke system calls such as pread(filehandle, outputBuffer, numberOfBytes, fileOffset) (e.g., line 2 and 3 of FIG. 3) to request the filesystem (e.g., File system 1) read the requested numberOfBytes starting at fileOffset into an output buffer (e.g., outputBuffer1 and outputBuffer2 in FIG. 3) allocated by that process (e.g., P1)

If an embodiment of the invention is not applied, after the file is opened, 1024 bytes are read during a first step from the file beginning at offset 4096 into a first buffer (e.g., outputBuffer1), second 1024 bytes are read during a second step from the beginning of the file (i.e., at offset 0 into a second buffer (e.g., outputBuffer2), and finally a check sum operation (e.g., see line 4 in FIG. 3) is performed on both data buffers. Depending on the media (e.g., the data storage component 230) in which the file is stored, the cost of moving forwards to offset 4096 on the first step and then moving backwards to offset 0 on the second step can be significant. Therefore an embodiment of the invention focuses on delaying the read operations until the corresponding data buffers are accessed by the process.

Figure 4:
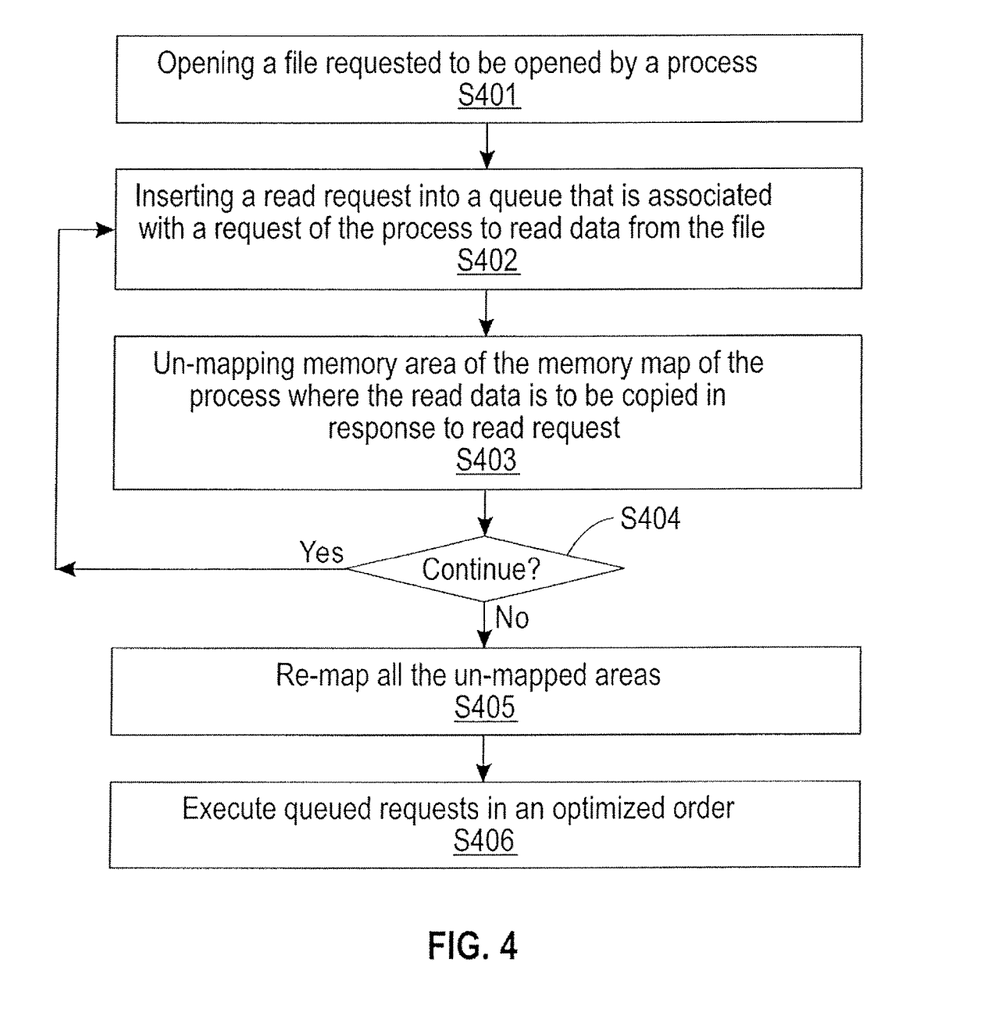
FIG. 4 illustrates a method for driving the system according to embodiments of the present invention.

FIG. 4 illustrates a method of processing code including sequential I/O operations according to an exemplary embodiment of the invention. The method will be discussed with respect to the code of FIG. 3 and FIGS. 5-9, which illustrate each step of the method.

Figure 5:
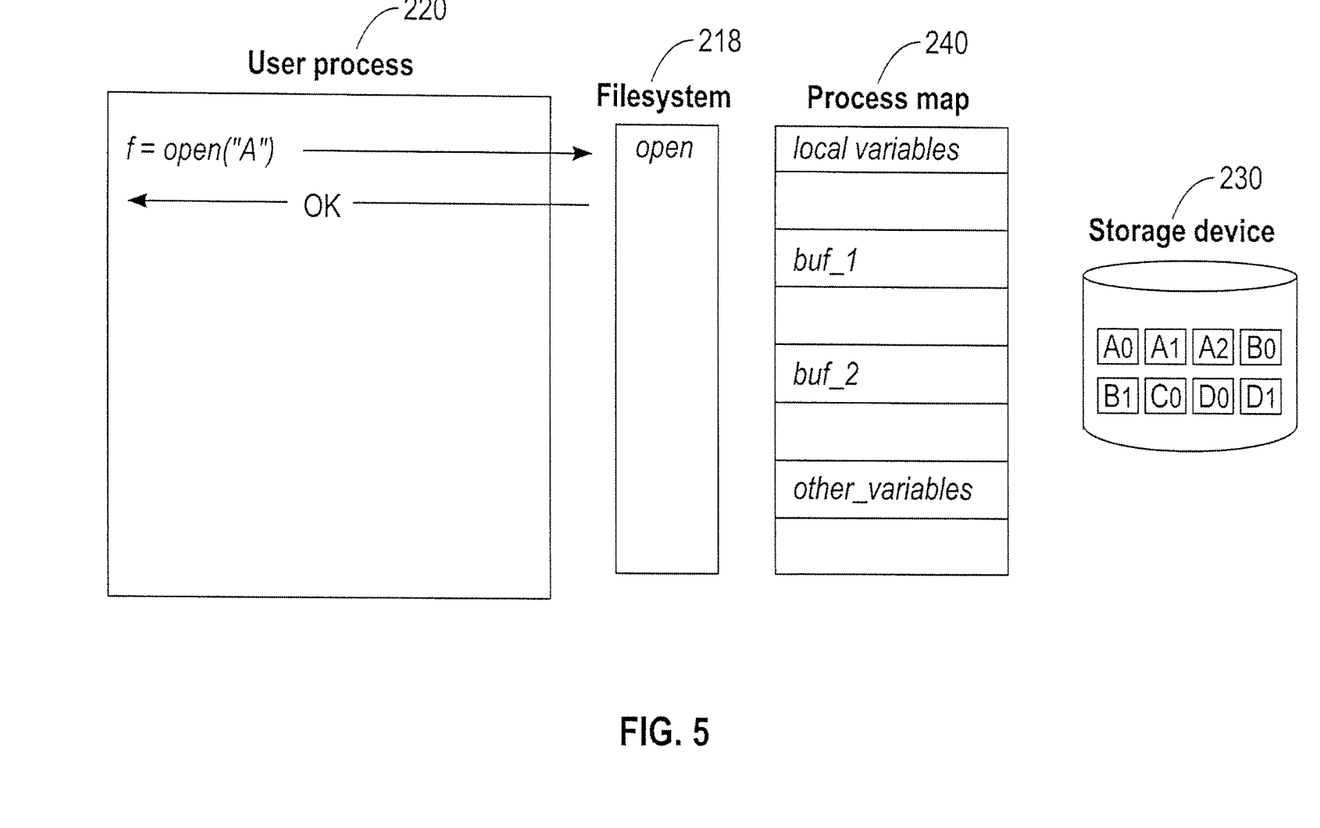
FIG. 5 is an illustration of a file being opened by the process.

Referring to FIG. 4 and FIG. 5, the method includes opening a file requested to be opened by a process (S401). For example, if the process includes the code of FIG. 3, the processing unit 16 can execute the open function of line 1 of FIG. 3 to open the file named "A", which is illustrated in FIG. 5. The open request causes the filesystem 218 to check that the file exists, that permissions allow the caller to open the file, and returns a handle to the caller.

Figure 6:
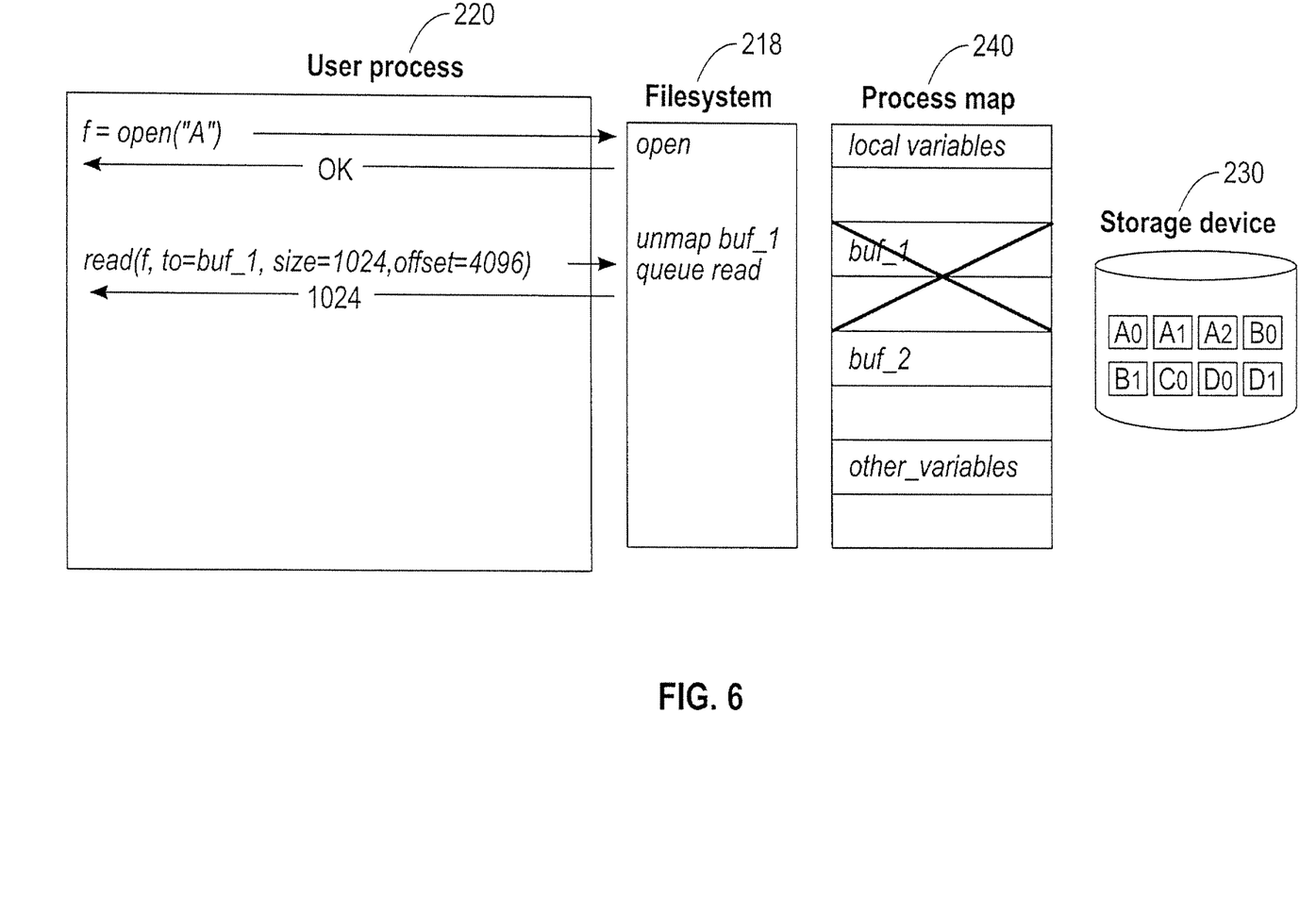
FIGS. 6-7 illustrate un-mappings that may occur in the method.

Referring to FIG. 4 and FIG. 6, the method next includes inserting a read request into a queue that is associated with a request of the process to read data from the file (S402), For example, the read request may be applied when the process executes line 2 of FIG. 3, which includes a read( ) function (e.g., pread). The read( ) function is a modified version of a standard read( ) function that would be typically found within the kernel of the operating system 210. A queue has been introduced into the kernel's read( ) function that is used to queue process read requests. Each entry in the queue contains the target file system (e.g., file system 1), the handle of the file (e.g., see parameter labeled fileHandle in FIG. 3), the number of bytes that are to be read (e.g., see parameter labeled 1024 in FIG. 3), and the address of the output buffer (e.g., see parameter labeled outputBuffer1 in FIG. 3) where the read results are to be copied.

Referring to FIG. 4 and FIG. 6, the method further includes un-mapping a memory area (e.g., buf_1) of the process memory map of the process where the read data is to be copied in response to the read request (S403). The un-mapping may be with respect to a larger number of bytes than what is to be read according to the read request. For example, if the read request is for less bytes than a full page of memory, the un-mapping un-maps an entire page that covers the bytes that need to be read. For example, if a page is 4 k, and the read is with respect to 1 k (e.g., 0-1 k), the un-mapping un-map the entire 4 k (e.g., 0-4 k). For example, the 'X'ed out portion illustrated in FIG. 6 is an illustration of the memory area associated with the output buffer (e.g., outputBuffer1) being un-mapped. Many operating systems offer a feature that allows inactive memory areas to be paged out to disk in order to free up main memory for other processes. Once the process attempts to access these paged-out memory areas, a trap handler in the kernel of the operating system 210 brings these pages back from disk into the main memory. An exemplary embodiment of the invention augments this mechanism so that every time a new entry is added into the request queue and the process attempts to access some of the output buffer memory addresses, the page(s) of memory covering the addresses associated with the corresponding queued entry are mapped back into the requester's process map table. For example, the file system event handler 214 illustrated in FIG. 2 is an example of this augmented trap handler. Please note, while step S403 is illustrated in FIG. 4 as being after step S402, in alternate embodiments, step S403 may be performed before step S402.

The method next includes determining whether to continue queuing up requests (S404). For example, the method will continue to queue up read requests until a certain condition occurs. These conditions may include the following: the process attempting to access an area that was un-mapped, the process attempting to write to the file, the process having already queued up a pre-determined number of read requests.

Figure 7:
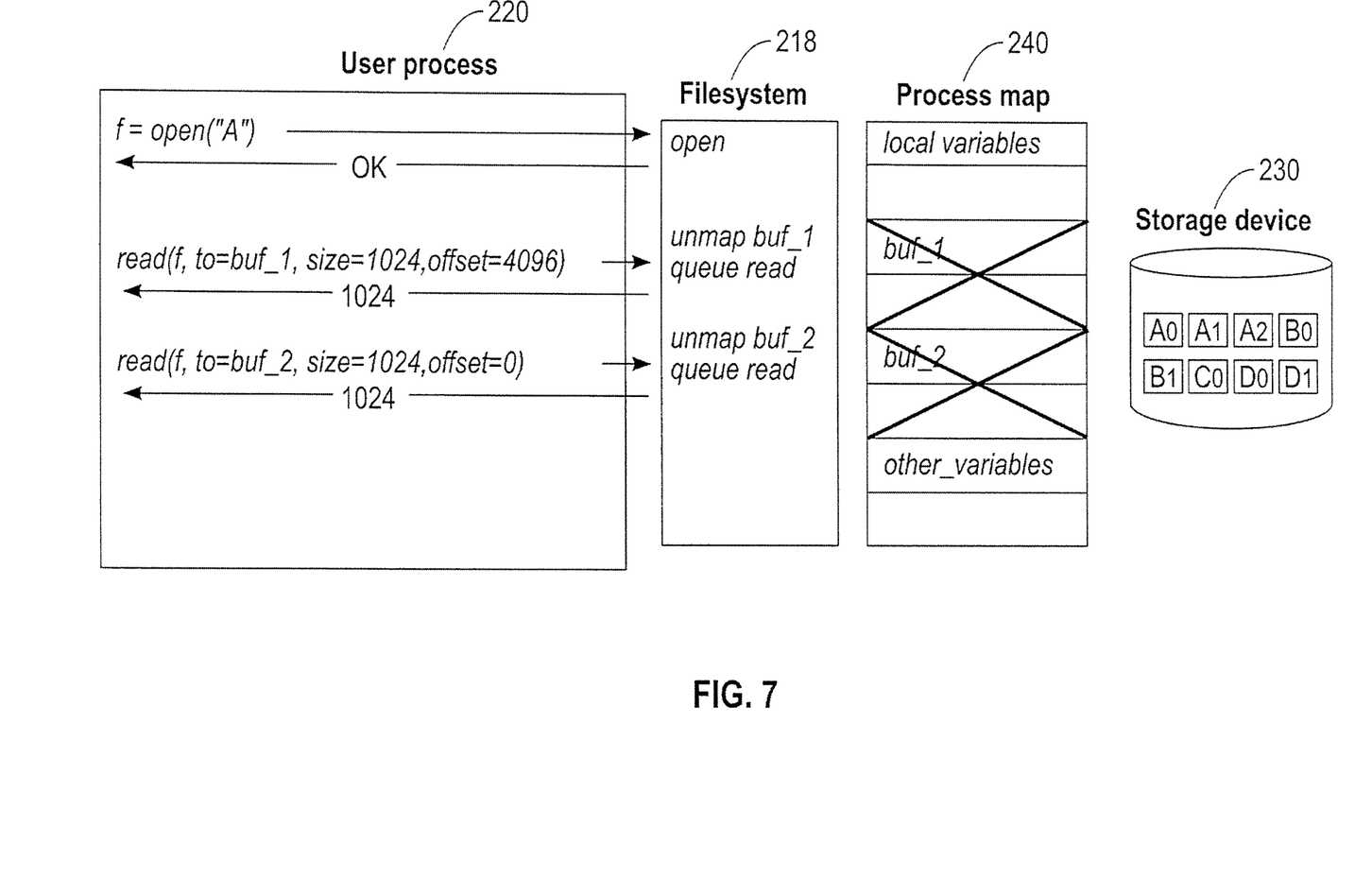

FIG. 7 illustrates an example where the method has determined that it should continue. For example, the read instruction in line 3 of FIG. 3 requesting a read of 1024 bytes from the file starting at offset 0 causes a second read request to be inserted into the queue and a second area of the process map to be un-mapped. For example, the un-mapped second area labeled as buf_2 in FIG. 7 corresponds to outputBuffer2 of FIG. 3. The process believes that it has read the requested number of bytes from the file into buf_2, even though the original request is still pending (e.g., yet to be serviced). Instead, the read operation associated with the read instruction has been queued and the process's memory area associated with buf_2 is un-mapped from the process map table.

Figure 8:
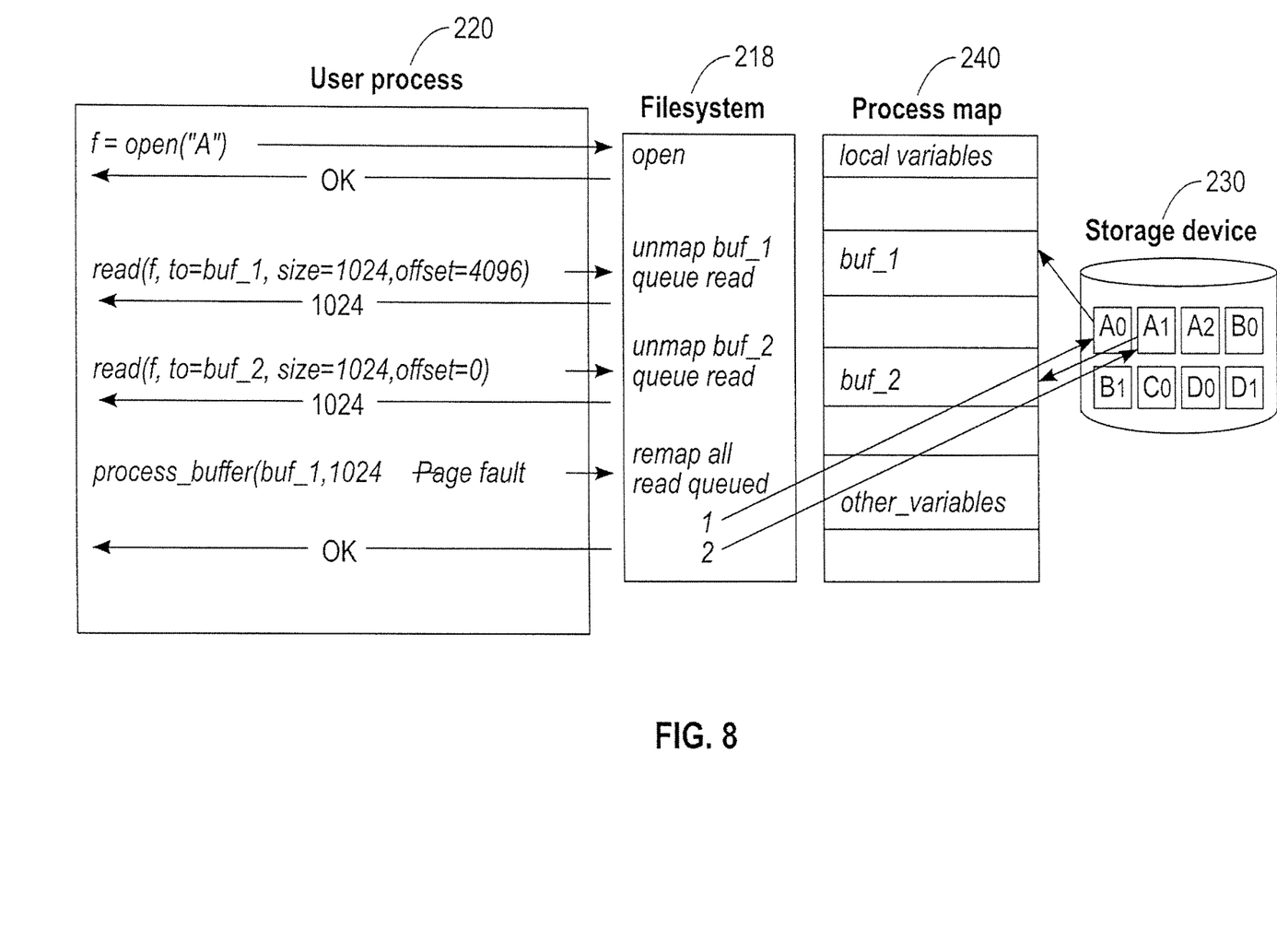
FIG. 8 illustrates a re-mapping that may occur in the method.

When the method has determined that it should not continue queuing up requests, the method re-maps all of the prior un-mapped areas (S405), and executes all of the queued requests in an optimized order (S406). For example, the order may be optimized to reduce the seek time, which is the time taken for a disk drive to locate an area of the disk were the data to be read is stored. FIG. 8 illustrates an example of the process attempting, to access a first un-mapped area (e.g., buf_1), which results in a page fault. For example, since the instruction on line 4 of the code illustrated in FIG. 3 needs to first access the first output buffer (e.g., outputBuffer1), and the area of the process map of the process for this buffer has been un-mapped, a page fault occurs.

The file system event handler 214 responds to the page fault by re-mapping all the areas that were un-mapped including the second un-mapped area (e.g., buf_2). For example, the page fault triggers the file system event handler 214. The file system event handler 214 (e.g., trap handler) then coalesces all of that process' queued requests and sends them as a whole to the underlying filesystem, which does the actual read operations. In an embodiment, the underlying filesystem is configured to receive a command from the event handler 214 to read data from a file at multiple offsets and differing amounts of requested bytes from those offsets so that the underlying filesystem can process the queued requests as a whole.

The file system is able to determine the best access order to serve the read requests based on (1) the current position of the medium's read head and on (2) the physical location in the medium where each requested data is stored. By doing so, a single-threaded application can gain the benefits of efficient I/O that are often given only to high performance computing applications carefully crafted to execute parallel I/O. In an exemplary embodiment, rather than rely on the file system to re-order the requests, the event handler 214 re-orders the requests on its own. For example, the event handler 214 could sort the requests in ascending or descending order of offsets.

Figure 9:
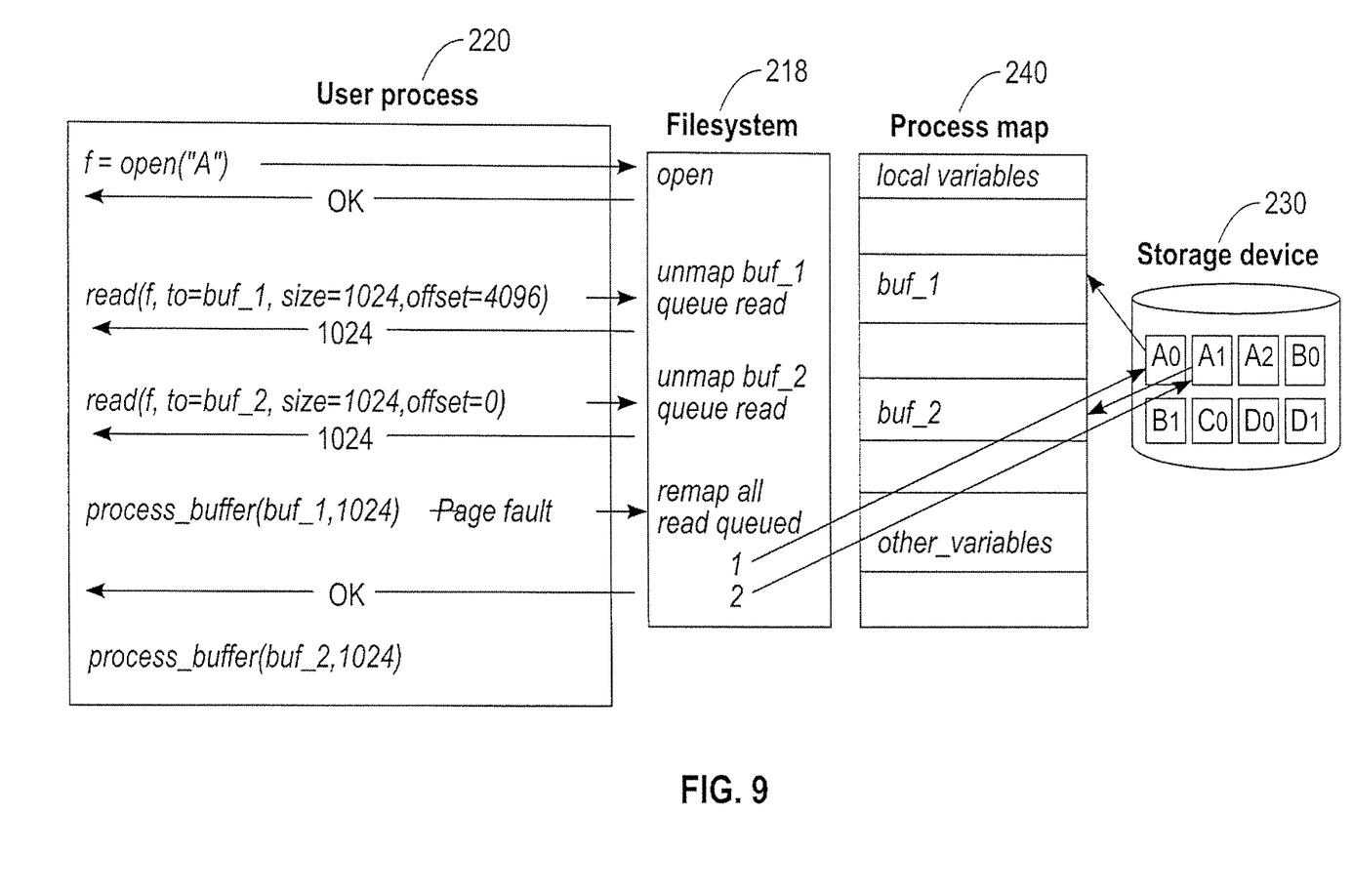
FIG. 9 illustrates a processing of the re-mapped areas that may occur in the method.

As shown in FIG. 9, once the queued requests have been serviced and the pages have been re-mapped, further queued operations are serviced with no need to involve the kernel anymore.

Embodiments of the invention are implemented at the operating system's kernel level of the operating system 210 and not within the processes 220 themselves. In essence a trap is created in a common low-level API that all applications/processes will eventually use if they operate on files. For example, no matter what language an application is written in, ultimately that software's requests to read data from a file will end up being handled by that low-level API in the kernel. Thus, as long as an application performs a set of calls to regular read requests, embodiments of the invention are able, to intercept these requests and queue them according to the above described methods Please note that while the sample code illustrated in FIG. 3 shows two immediately consecutive reads, the invention is not limited thereto. For example, there may be intervening instructions between the reads. If the intervening instructions do not attempt to operate on the un-mapped areas, they are processed normally.

Figure 10:
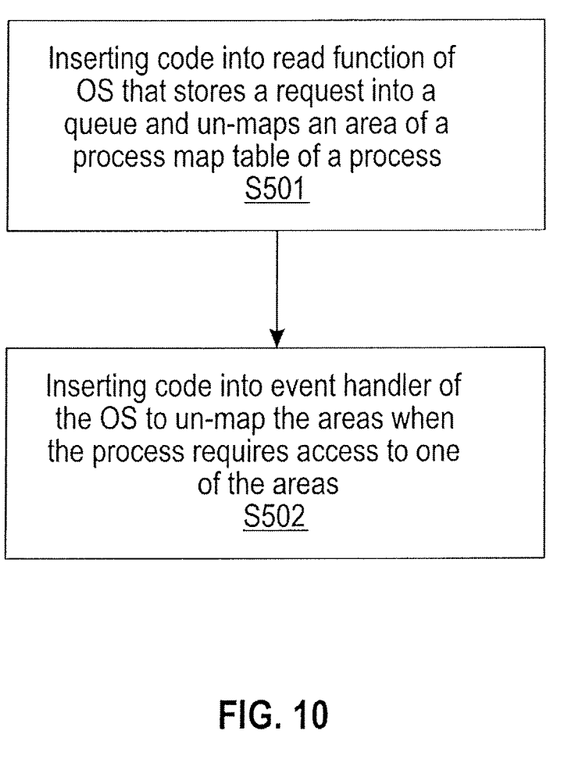
FIG. 10 illustrates a method for building an operating system of the system according to an exemplary embodiment of the invention.

FIG. 10 illustrates a method for implementing an embodiment of the invention on an existing operating system 210.

Referring to FIG. 10, the method includes: inserting code into a read function of the OS that stores a request into a queue and un-maps an area of a process map table of a process (S501). The function is designed so that each time the read function is executed by the same process to read data from a file, it stores a new entry into the queue. The un-mapped area includes addresses where the read data is to be copied.

The method further includes inserting code into an event handler of the OS to un-map the areas when the process requires access to one of the areas (S502). For example the process requires access to one of the areas when the process has executed an instruction that operates on one of the areas or when the process has executed an instruction that writes to the file. In an embodiment in which the operating system is 210 is interpreted at run-time, it does not require re-compiling after the above code insertions are made.

In an alternate embodiment, when the operating system 210 is non-interpretative, the method may further include compiling or re-compiling the code of the operating system.

Embodiments of the invention may be applied to various software including desktop/embedded/server software, software that reads data but never consumes or operates on that data, software reading large collections of data (e.g., satellite imagery, sensing data from oil reservoirs, etc.).

The units shown in FIG. 2 may be implemented by various manners, including software, hardware, firmware or a random combination thereof. For example, in some embodiments, the apparatus may be implemented by software and/or firmware. Alternatively or additionally, the system of FIG. 2 may be implemented partially or completely based on hardware. For example, one or more units in the system may be implemented as an integrated circuit (IC) chip, an application-specific integrated circuit (ASIC), a system on chip (SOC), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer storage management system comprising: a memory storing a process and an operating system; and
    a processor executing the process and the operating system, the operating system comprising:
    a filesystem configured to receive a plurality of read requests from the process to access data stored on a file within the memory; and
    a filesystem event handler configured to perform the following steps prior accessing the file:
        receiving a first read request and a second read request;
        inserting the first read request and the second read request into a queue associated with the process to read data from the file, where each entry in the queue contains a target file system, a handle of the file, a number of bytes that are to be read, an address of an output buffer where the read results of the read are to be copied;
        un-mapping a memory area associated with the respective addresses of the output buffer from a process map table;
        receiving a request to access an un-mapped memory area where the request results in a page fault;
        reordering the queue according to an order of offsets such that the first request occurs after the second request;
        re-mapping the respective un-mapped memory areas according to the reordering;
        execute the first and second requests according to their order in the queue; wherein the first request references a first offset into the file that is later in the file than a second offset reference by the second request.

2. The computer system of claim 1, wherein the operating system includes a read function configured to read data from the file stored in the memory.

3. The computer storage management system of claim 2, wherein the read function includes the queue.

4. The computer storage management system of 3, wherein each request is stored in an entry of the queue upon execution of the read function by the process.

5. The computer storage management system of claim 4, wherein the entry includes a first identifier that identifies the file, a second identifier that identifies a number of bytes to read from the file, and a third identifier that identifies an address the read data is to be copied onto.

6. The computer storage management system of claim 1, wherein the filesystem event handler re-maps the respective un-mapped memory areas after an instruction of the process accessing the output buffer is executed.

7. The computer storage management system of claim 1, wherein the filesystem event handler re-maps the respective un-mapped memory areas after a number of the requests exceeds a threshold value.

8. The computer storage management system of claim 1, wherein the filesystem event handler re-maps the respective un-mapped memory areas after an instruction of the process for writing to the file is executed.

9. The computer storage management system of claim 1, wherein a size of the respective un-mapped memory areas is a whole number of blocks and a size of the read data is less than or equal to the size of the respective un-mapped memory areas.

10. A method of controlling a storage management system, the method comprising:
    receiving, by a filesystem, a plurality of read requests from a process to access data stored on a file within a memory;
    in response to the receiving, a filesystem event handler configured to perform the following steps prior to accessing the file:
        receiving a first read request and a second read request;
        inserting the first read request and the second read request into a queue associated with the process to read data from the file, wherein each entry in the queue contains a target file system, a handle of the file, a number of bytes that are to be read, an address of the output buffer where read results of the read are to be copied;
        un-mapping a memory area associated with the respective addresses of the output buffer from a process map table;
        receiving a request to access an un-mapped memory area wherein the request results in a page fault;
        reordering the queue according to an order of offsets such that the first request occurs after the second request;
        re-mapping the respective un-mapped memory areas according to the reordering;
    execute the first and second requests according to their order in the queue; wherein the first request references a first offset into the file that is later in the file than a second offset referenced by the second request.

11. The method of claim 10, wherein the re-mapping occurs when the process has executed an instruction that operates on one of the addresses.

12. The method of claim 10, wherein the re-mapping occurs when the process has executed an instruction that updates or writes to the file.

13. The method of claim 10, wherein the re-mapping occurs when the number of requests exceeds a threshold.

* * * * *